United States Patent [19]

Stitzer

[11] 4,325,140
[45] Apr. 13, 1982

[54] FULL DUPLEX COMMUNICATION SYSTEM APPARATUS USING FREQUENCY SELECTIVE LIMITERS

[75] Inventor: Steven N. Stitzer, Ellicott City, Md.

[73] Assignee: The United States of America as represented by the Scretary of the Air Force, Washington, D.C.

[21] Appl. No.: 129,860

[22] Filed: Mar. 13, 1980

Related U.S. Application Data

[63] Continuation of Ser. No. 949,367, Oct. 6, 1978, abandoned.

[51] Int. Cl.³ .............................................. H04B 1/50
[52] U.S. Cl. .................................. 455/19; 333/17 L; 370/26; 370/38; 455/86
[58] Field of Search ............... 370/26, 38, 39; 455/14, 455/19, 21, 24; 333/1.1, 17 L

[56] References Cited

U.S. PATENT DOCUMENTS

| | | | |
|---|---|---|---|
| 3,082,383 | 3/1963 | Stern | 333/1.1 |
| 3,095,561 | 6/1963 | Hubka | 455/84 X |
| 3,641,433 | 2/1972 | Mifflin et al. | 455/19 X |
| 3,987,396 | 10/1976 | Kreger | 455/19 |
| 4,044,357 | 8/1977 | Goldie | 333/17 L X |
| 4,134,068 | 1/1979 | Richardson | 455/19 |
| 4,155,039 | 5/1979 | Lechevin | 455/53 |

OTHER PUBLICATIONS

Stitzer et al., *X-Band YIG Limiters for FM/CW Radar*, The Microwave Journal, Dec. 1977, vol. 20, No. 12.

*Primary Examiner*—Paul L. Gensler
*Attorney, Agent, or Firm*—Donald J. Singer; William Stepanishen

[57] ABSTRACT

A microwave duplexer apparatus utilizing a frequency selective limiter unit in conjunction with a microwave circulator to direct RF energy from a transmitter to an antenna and from an antenna to a receiver in a single antenna duplex communication system.

6 Claims, 5 Drawing Figures

FULL DUPLEX COMMUNICATION SYSTEM APPARATUS USING FREQUENCY SELECTIVE LIMITERSgi

STATMENT OF GOVERNMENT INTEREST

The invention described herein may be manufactured and used by or for the Government for governmental purposes without the payment of any royalty thereon.

This is a continuation of co-pending patent application Ser. No. 949,367 entitled DUPLEX COMMUNICATION SYSTEM APPARATUS USING FREQUENCY SELECTIVE LIMITERS filed by Steven N. Stitzer on Oct. 6, 1978, now abandoned.

BACKGROUND OF THE INVENTION

The present invention relates broadly to a full duplex communication system, and in particular to a full duplex communication system apparatus using frequency selective limiter units.

In the prior art, conventional filter type duplexers use a combination of bandpass and bandstop filters to direct RF energy from the transmitter to the antenna and from the antenna to the receiver. If either the transmitter or received frequency changes, the duplexer must be re-tuned in order to maintain efficient operation, which is usually a time consuming and complex process. The stability of the filters and their associated losses are also cause for concern in the filter type duplexer. Full operation duplexers for single antenna systems have been built using circulators but the level of isolation of the receiver from the transmitted power is limited to the degree of matching of the antenna to the system. Wide excursions in transmitted frequency usually result in large reflections from the antenna, thus the circulator duplexer is generally restricted to low power systems. In addition, large reflections may also occur if a highly reflective body is accidentally placed in front of the antenna. When these high power levels reach the receiver, the intermodulation performance suffers, and the receiver front end may also be permanently damaged. The present microwave duplexer apparatus provides the means for a full duplex communication system which overcomes the aforementioned prior art problems.

SUMMARY OF THE INVENTION

The present invention utilizes a microwave circulator in conjunction with a frequency selective limiter to couple RF energy from a transmitter to an antenna and also the RF from the antenna to the receiver in a single antenna communications system. The frequency selective limiter unit utilizes a transmission line comprising a suitable ferrite material which is biased into resonance by an external magnetic field. The frequency selective limiter permits a single antenna communication system to operate at greater transmitted power levels since RF signals exceeding a predetermined threshold level are attenuated and signals below the threshold are passed, thus the receiver is effectively isolated from the transmitted power.

It is one object of the present invention, therefore, to provide an improved full duplex communication system apparatus.

It is another object of the invention to provide an improved full duplex communication system apparatus providing greater isolation of the receiver from transmitter power leakage.

It is still another object of the invention to provide an improved full duplex communication system apparatus wherein increased transmitter power levels are utilized.

It is yet another object of the invention to provide an improved full duplex communication system apparatus wherein greater frequency agility is achieved without external control to track the system frequencies.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
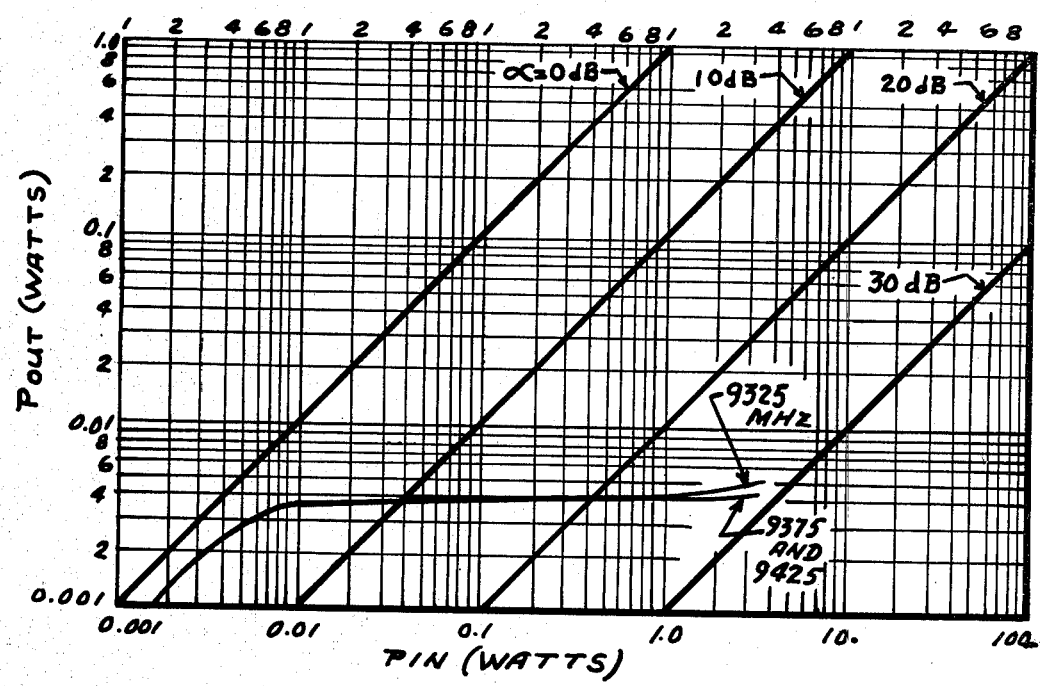
FIG. 1 is a graphical representation of the CW power limiting characteristics of a typical frequency selective limiter.
Figure 2:
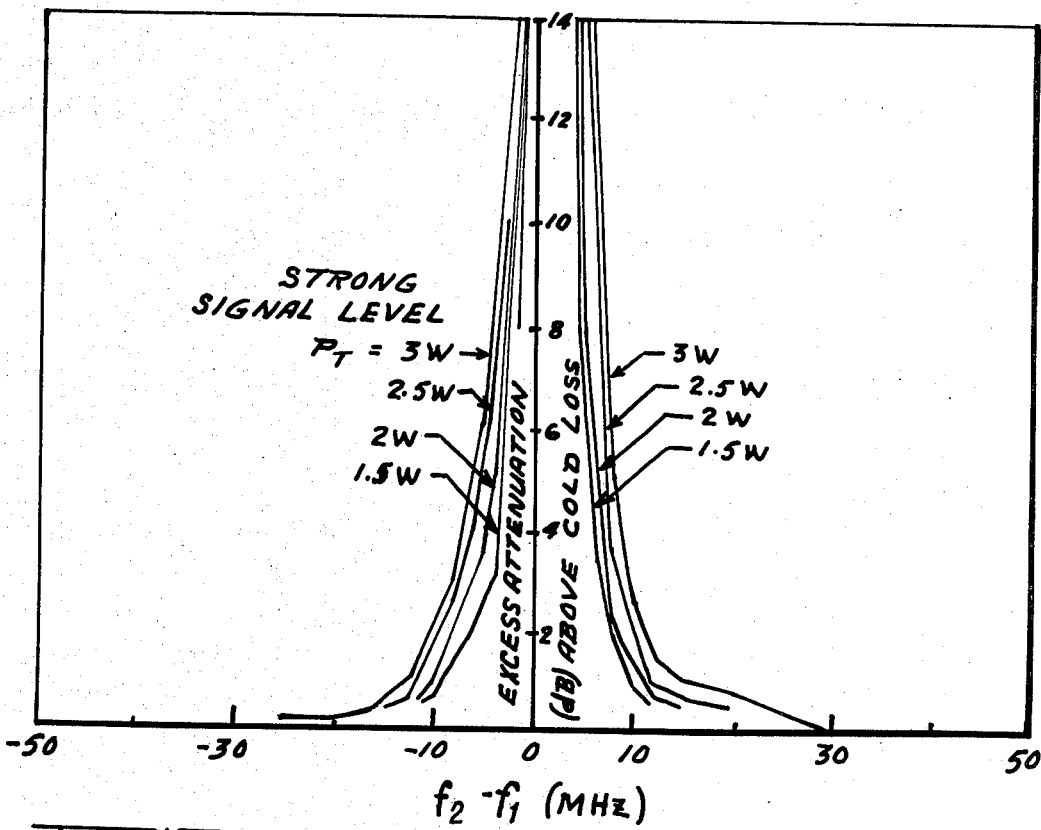
FIG. 2 is a graphical representation of the frequency selectivity characteristics of a typical frequency selective limiter.

The frequency selective limiter, also referred to herein as an FSL, is a non-linear device that attenuates or limits RF signals whose levels exceed a predetermined critical threshold level while simultaneously allowing low loss transmission of below-threshold RF signals. A frequency selective limiter for operating at microwave frequencies utilizes a transmission line coupled to a suitable ferrite material such as yttrium-iron-garnet (YIG) which may be biased into a subsidiary resonance by an applied external static magnetic field. While there are other usable modes of operation for the frequency selective limiter unit, the subsidiary resonance mode exhibits good frequency selective limiting with resonably low threshold over broad instantaneous bandwidths. The power limiting characteristics and frequency selectivity of such a frequency selective limiter device are shown in FIGS. 1 and 2. The below-threshold insertion loss is less than 2 dB over a 100 MHz passband at X-band.

Figure 3:
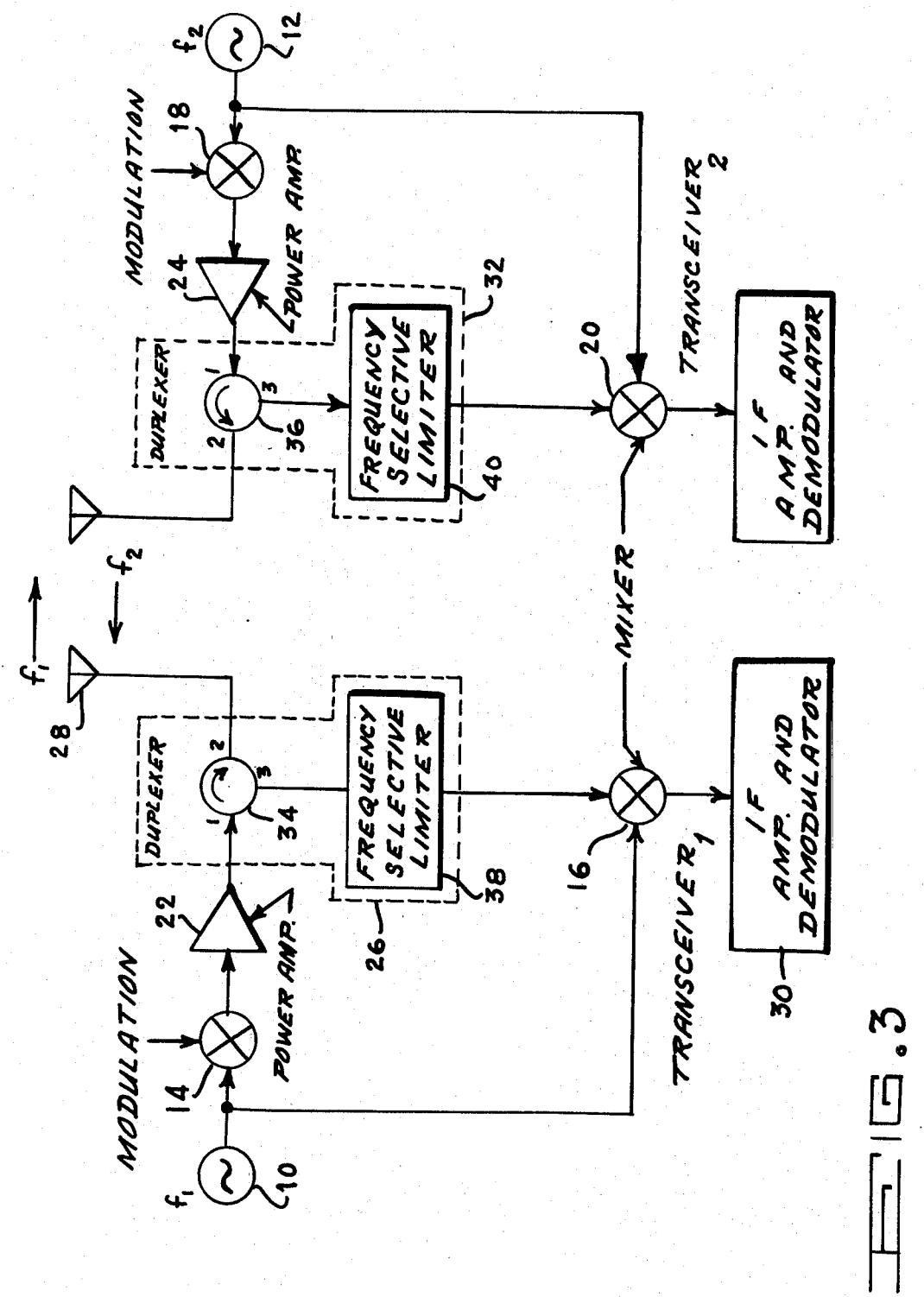
FIG. 3 is a block diagram of a full duplex communication system according to the present invention.

Turning now to FIG. 3, there is shown a block diagram of a two-way communication system utilizing a pair of microwave duplexers with frequency selective limiter units therein, in the two transceiver units used in the system. The full duplex communication system comprises a pair of mirror image circuits utilizing carrier generators 10, 12 to generate carrier frequencies, $f_1$, $f_2$. The carrier frequency $f_1$ is applied to mixers 14, 16 in transceiver 1, while carrier frequency $f_2$ is applied to mixers 18, 20 in transceiver 2. The modulation signal is applied as shown to mixer units 14, 18 respectively. The output signals from mixer units 14, 18 are respectively applied to power amplifier units 22, 24. The duplexer unit 26 is connected to receive the output from power amplifier unit 22. The duplexer unit 26 applies a first output signal to antenna 28 and a second output signal to mixer 16. The output signal from mixer unit 16 is applied to an I.F. amplifier and demodulator unit 30. The corresponding elements in transceiver 2 are connected and function in a manner as that described for transceiver 1. The duplexer units 26, 32 of transceivers 1, 2 are respectively comprised of circulators 34, 36, both having a first, second and third port and frequency selective limiter units 38, 40.

The output from an oscillator running at the transmitter carrier frequency, $f_1$, is modulated (for FM, the modulation could be applied directly to a voltage-controlled oscillator), amplified, and fed to port 1 of the circulator. The RF emerges from port 2 and is radiated by the antenna. Reflected power due to antenna mismatch or other causes, along with the incoming signal from the other transmitter at frequency $f_2$, enters port 2 and emerges from port 3 of the circulator, whence it passes to the frequency selective limiter. The strong reflection is limited to a safe level, while the signal from the other transmitter passes with little attenuation since $f_2 \neq f_1$. For a typical separation of 30 MHz, it may be seen in FIG. 1 that the transmitter leakage could be attenuated approximately 30 db while the weak signal suffers less than 1 dB excess attenuation as shown in FIG. 2. In FIG. 1, attenuation lines, are given for 0 dB, 10 dB, 20 dB and 30 dB. In FIG. 2, there is shown the transmitted leakage power, $P_T$, curves for various power levels. Thus, if the transmitter power is 30 watts, and the antenna return loss is greater than 10 dB, the transmitter leakage would be less than +7 dBm. Without the frequency selective limiter, the maximum practical transmitted power for the same degree of leakage would be 0.05 watt. Frequency selective limiters with greater isolation would permit proportionately higher transmitter power levels.

A separate path from the local transmitter oscillator provides local oscillator injection to the mixer, wherein the desired signal $f_2$ is translated to the intermediate frequency for amplification and demodulation. The separate local oscillator injection path could be eliminated and the leakage signal from the frequency selective limiter could provide local oscillator injection to a single ended mixer. However, the transmitter leakage carries the transmitted modulation which would be demodulated along with the information arriving at $f_2$. Operation of the other transceiver is identical except the roles of $f_1$ and $f_2$ are reversed. The intermediate frequency in both transceivers is equal to $|f_2 - f_1|$.

In an AM system, the limiter would tend to strip off the modulation, leaving a nearly unmodulated signal for local oscillator injection. In an FM system, a sample of the transmitted information could be injected into the demodulator output with the appropriate phase shift to cancel the sidetone.

The present concept is not restricted to two transceivers. For example, one transceiver transmitting on $f_1$ could communicate simultaneously with several other transceivers on $f_2$. In principle, the frequency selective limiter is capable of selectively limiting an unlimited number of discrete frequencies simultaneously, enabling a single transmitter amplifier and/or antenna to transmit and/or receive at several frequencies without additional complexity in the duplexer.

Figure 4:
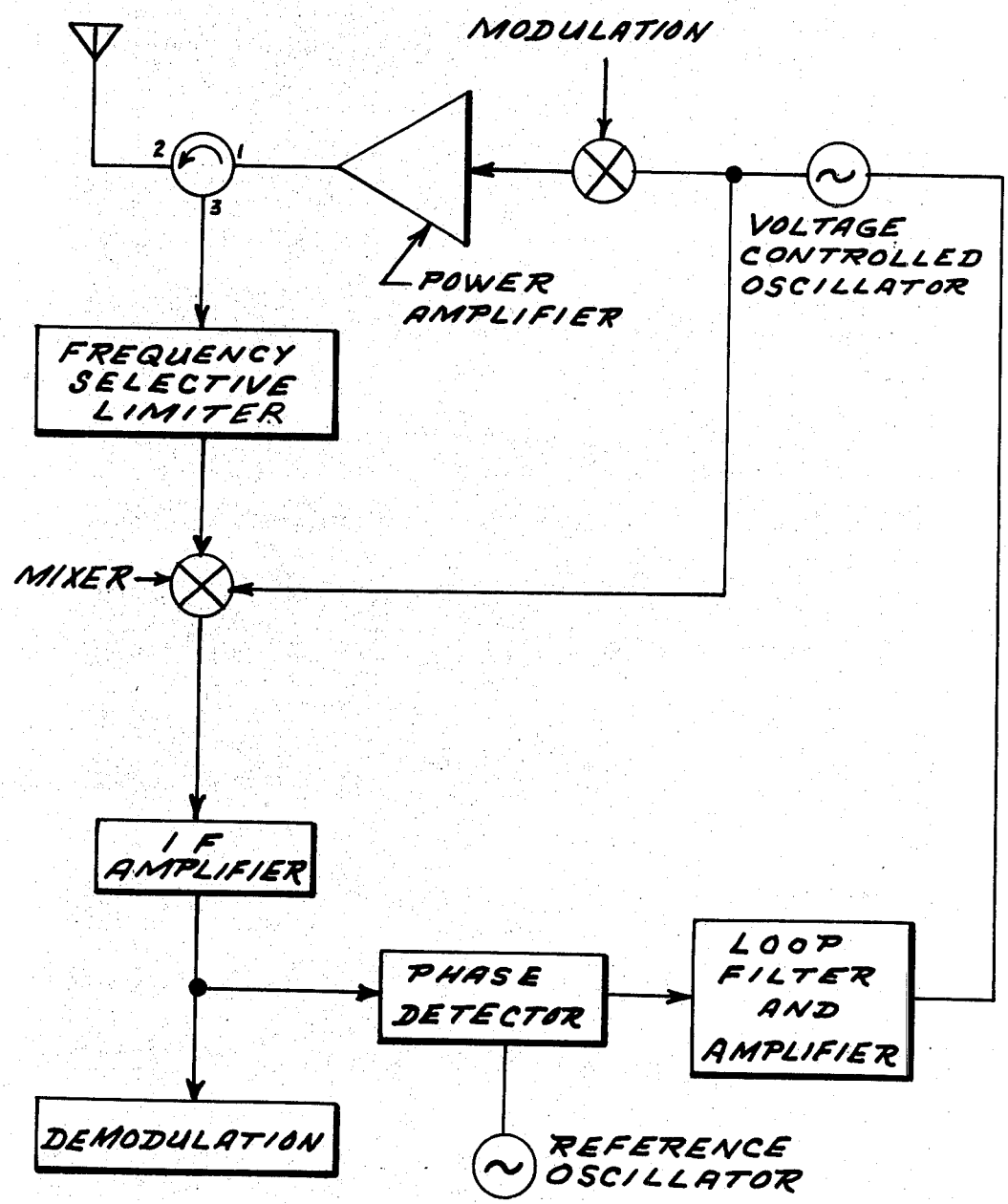
FIG. 4 is a block diagram of a frequency tracking transceiver utilizing the microwave duplexer apparatus; and, FIG. 5 is a block diagram of a frequency tracking repeater utilizing the present duplexer apparatus.

Since the IF's in the two-way system of FIG. 3 are equal to $|f_2 - f_1|$, $f_1 - f_2$ must be stabilized. A simple phase lock system can be used in one of the transceivers to lock its oscillator onto the other transmitter's frequency plus or minus the IF. Such as system is shown in FIG. 4. The reference oscillator frequency which is typically crystal controlled, is equal to the desired IF. The phase detector detects a deviation of $|f_2 - f_1|$ from the reference frequency, and automatically shifts $f_2$ to reduce the deviation to zero. Thus $f_2$ always tracks $f_1$. Such changes could be due to undesirable drift found in any oscillator, or if a secure system is required, frequency agility could be used to prevent eavesdropping. Transceiver 2 would automatically track transceiver 1 over any arbitrary frequency program.

Figure 5:
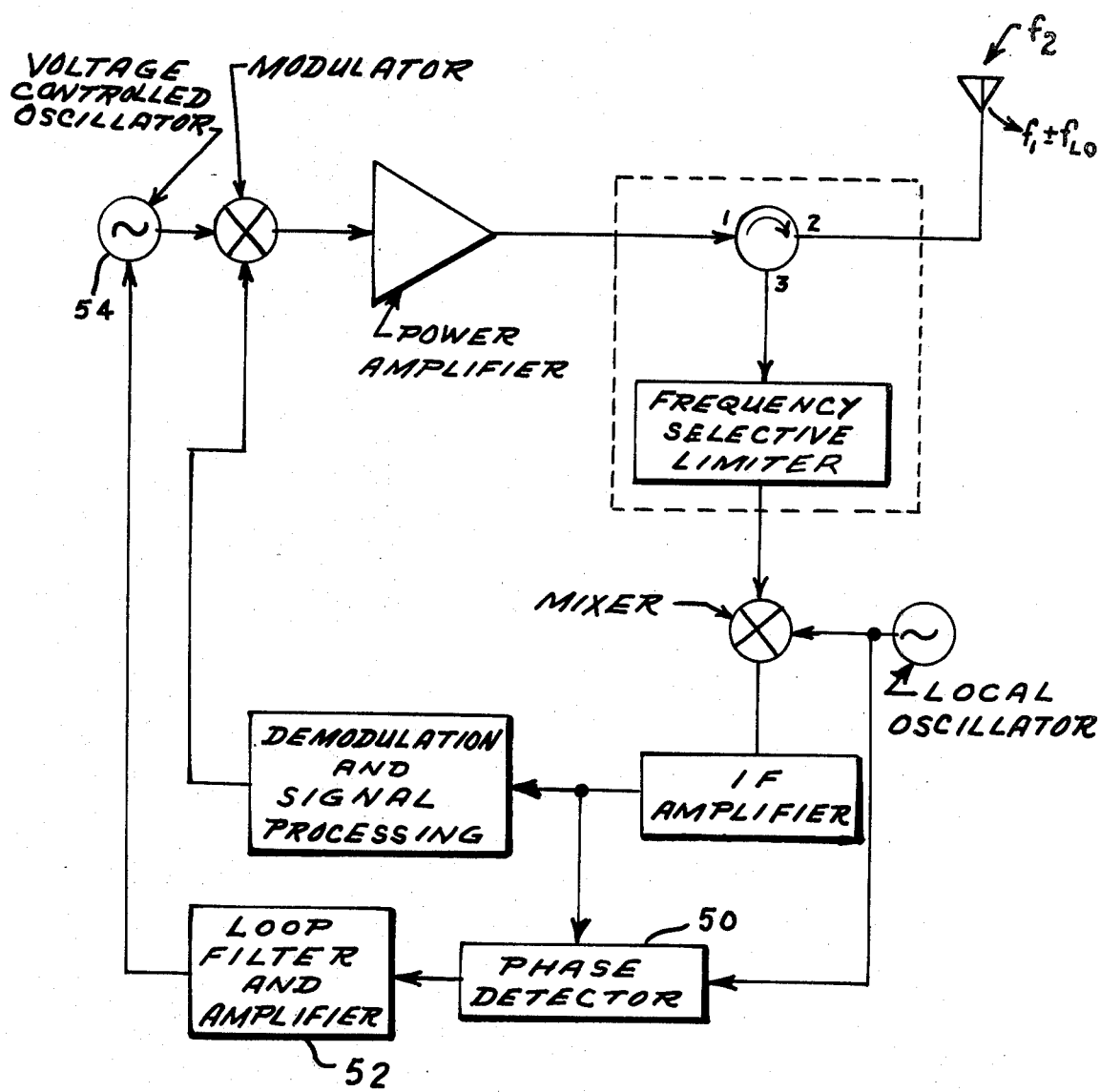

A block diagram of a frequency tracking repeater unit using a frequency selective limiter in the duplexer is shown in FIG. 5. A signal at $f_2$ is intercepted by the antenna and is directed to the frequency selective limiter by the circulator. The signal is down converted and demodulated. After any further processing, the demodulated information modulates the carrier, which is then amplified, and passed back to the antenna through the circulator. Reflected power due to antenna mismatch is prevented from desensitizing or damaging the receiver by the frequency selective limiter. The frequency agility in the repeater circuit is provided by the phase detector 50, loop filter/amplifier 52, and voltage-controlled oscillator 54. The loop forces the VCO to satisfy the relationship $f_{vco} = f_{in} \pm f_{lo}$, or $f_{transmitter} = f_{receiver} \pm f_{lo}$. (The sign depends on the polarity of the phase detector inputs). Thus the repeater will retransmit the information received on the incoming frequency at a fixed offset frequency, providing frequency agility.

Although the invention has been described with reference to a particular embodiment, it will be understood to those skilled in the art that the invention is capable of a variety of alternative embodiments within the spirit and scope of the appended claims.

What is claimed is:

1. In a microwave duplexer communications system, a frequency tracking repeater apparatus comprising in combination:

a transmit/receive antenna, said transmit/receive antenna receiving a carrier frequency $f_2$, a carrier frequency signal generator to provide a carrier frequency signal, said carrier frequency signal generator generating a carrier frequency $f_1$, a first mixer connected to said carrier frequency signal generator to receive said carrier frequency signal $f_1$ and a modulation signal, said first mixer mixing said carrier frequency signal and said modulation signal to provide a modulated carrier frequency signal for transmission by said transmit/receiver antenna, a microwave circulator having first, second and third ports, said first port receiving said modulated carrier frequency signal from said first mixer, and said second port being connected to said transmit/receive antenna and passing transmitted and received signals therethrough, a frequency selective limiter unit connected to said third port of said microwave circulator, said frequency selective limiter unit attenuating signals that exceed a predetermined threshold level and providing low loss transmission of signals below said predetermined threshold, said frequency selective limiter unit operating over a predetermined band of frequencies and allowing transmission of output signals therethrough that comprise a plurality of frequencies having a level lower than said predetermined threshold level, a local oscillator generating a local oscillator signal, a second mixer connected to said frequency selective limiter unit to receive the output signals therefrom, said second mixer mixing said output signals from said frequency selective limiter unit with said local oscillator signal to provide an IF signal, and an IF amplifier/demodulator unit connected to said second mixer unit to receive said IF signal, said IF amplifier/demodulator unit amplifying and demodulating said IF signal to extract the intelligence thereon, and a phase lock circuit for locking said carrier frequency signal generator frequency $f_1$ to said received carrier signal frequency $f_2$, said phase lock circuit comprising, a phase detector receiving the outputs of said local oscillator and said second mixer and controlling said carrier frequency signal generator in response thereto, and a feedback circuit from said IF amplifier/demodulator unit to said first mixer to provide a modulation signal.

2. A frequency tracking repeater apparatus as described in claim 1 wherein said frequency selective limiter unit is biased into subsidiary resonance.

3. A frequency tracking repeater apparatus as described in claim 1 wherein said frequency selective limiter unit comprises a transmission line utilizing a suitable ferrite material.

4. A frequency tracking repeater apparatus as described in claim 3 wherein said frequency selective limiter unit is biased into subsidiary resonance by an external static magnetic field.

5. A frequency tracking repeater apparatus as described in claim 3 wherein said ferrite material comprises yttrium-iron-garnet.

6. A frequency tracking repeater apparatus as described in claim 5 wherein said frequency selective limiter unit is operating in the subsidiary resonance mode to provide selective frequency limiting at a substantially low threshold level over broad instantaneous bandwidths.

* * * * *